US 10,316,949 B2

(12) United States Patent
Tiziani et al.

(10) Patent No.: US 10,316,949 B2
(45) Date of Patent: Jun. 11, 2019

(54) BEVEL GEAR WHEEL END ASSEMBLY

(71) Applicant: MERITOR HEAVY VEHICLE SYSTEMS CAMERI SpA, Cameri (Novara) (IT)

(72) Inventors: Eugenio Tiziani, Cameri (IT); Davide Bionaz, Cameri (IT)

(73) Assignee: Meritor Heavy Vehicle Systems Cameri SpA, Novara (IT)

( * ) Notice: Subject to any disclaimer, the term of this patent is extended or adjusted under 35 U.S.C. 154(b) by 82 days.

(21) Appl. No.: 15/176,677

(22) Filed: Jun. 8, 2016

(65) Prior Publication Data
US 2016/0363205 A1    Dec. 15, 2016

(30) Foreign Application Priority Data

Jun. 12, 2015    (EP) ..................................... 15171931

(51) Int. Cl.
*B60K 17/04* (2006.01)
*F16H 48/08* (2006.01)
*F16H 48/38* (2012.01)
*F16H 57/08* (2006.01)
(Continued)

(52) U.S. Cl.
CPC ........... *F16H 48/38* (2013.01); *B60K 17/043* (2013.01); *F16H 48/08* (2013.01); *F16H 57/043* (2013.01); *F16H 57/0471* (2013.01); *F16H 57/0483* (2013.01); *F16H 57/0493* (2013.01); *F16H 57/08* (2013.01); *B60K 17/046* (2013.01);
(Continued)

(58) Field of Classification Search
None
See application file for complete search history.

(56) References Cited

U.S. PATENT DOCUMENTS 1,974,803 A * 9/1934 Chilton .................. F01M 13/00
                                                    464/178
2,253,977 A * 8/1941 Kinnucan ............. F16H 1/2854
                                                    475/336
(Continued)

FOREIGN PATENT DOCUMENTS

CN      S59213522 A    12/1984
CN      101041325 A     9/2007
(Continued)

OTHER PUBLICATIONS

European Patent Office, Extended European Search Report for the corresponding European Patent Application No. 15171931.7 dated Jan. 18, 2016.
(Continued)

*Primary Examiner* — Charles A Fox
*Assistant Examiner* — Ryan P Dodd
(74) *Attorney, Agent, or Firm* — Brooks Kushman P.C.

(57) ABSTRACT

A bevel gear wheel end assembly having a housing, an input bevel gear, at least one driven bevel gear and a stationary bevel gear. The input bevel gear meshes with at least one driven bevel gear, at least one driven bevel gear is mounted on a shaft fixed relative to the housing, and at least one driven bevel gear meshes with the stationary bevel gear such that rotation of the input bevel gear about a drive axis at a first speed causes rotation of the housing about the drive axis at a second speed. An oil relief arrangement is provided in the shaft of at least one driven bevel gear.

17 Claims, 3 Drawing Sheets

(51) Int. Cl.
*F16H 57/04* (2010.01)
*F16H 1/28* (2006.01)

(52) U.S. Cl.
CPC ......... *B60Y 2306/03* (2013.01); *F16H 1/2854* (2013.01); *F16H 2057/085* (2013.01)

(56) References Cited

U.S. PATENT DOCUMENTS

| | | | |
|---|---|---|---|
| 3,199,375 A | | 8/1965 | Rosen et al. |
| 4,286,481 A | * | 9/1981 | Miller ............... F16H 1/2854 475/242 |
| 4,397,198 A | * | 8/1983 | Borgersen ............ B63H 23/02 440/75 |
| 4,840,089 A | * | 6/1989 | Williamson ............ F16H 48/08 475/184 |
| 5,989,143 A | * | 11/1999 | Bell .................... F16H 57/0421 184/11.2 |
| 2011/0053727 A1 | * | 3/2011 | Zhang ..................... F16H 1/46 475/221 |

FOREIGN PATENT DOCUMENTS

| | | | | |
|---|---|---|---|---|
| CN | 102003499 A | | 4/2011 | |
| DE | 510962 C | | 10/1930 | |
| DE | 1430473 A1 | | 10/1968 | |
| GB | 1443880 A | * | 7/1976 | ......... B60B 27/0047 |

OTHER PUBLICATIONS

The Chinese Patent Office, Office Action for related Chinese Patent Application No. 201610384093.1, dated Mar. 29, 2018.

* cited by examiner

BEVEL GEAR WHEEL END ASSEMBLY

TECHNICAL FIELD

The present invention relates to a bevel gear wheel end assembly having oil relief arrangement.

BACKGROUND

Bevel gear wheel end assemblies are used on vehicles to transfer rotation of a drive shaft to a wheel assembly.

SUMMARY

The invention aims to provide a bevel gear wheel end assembly having an oil relief arrangement to ensure adequate lubrication of the bevel gear wheel end assembly.

According to the first aspect of the present invention there is provided a bevel gear wheel end assembly having a housing, an input bevel gear, at least one driven bevel gear and a stationary bevel gear. The input bevel gear meshes with the at least one driven bevel gear, the at least one driven bevel gear is mounted on a shaft fixed relative to the housing, and the at least one driven bevel gear meshes with the stationary bevel gear such that rotation of the input bevel gear about a drive axis at a first speed causes rotation of the housing about the drive axis at a second speed, different from the first speed. An oil relief arrangement is provided in the shaft of the at least one driven bevel gear.

Provision of the oil relief arrangement in the shaft of the at least one driven bevel gear facilitates efficient lubrication of the bevel gear wheel end assembly.

The oil relief arrangement may have a first oil relief passage extending from a first aperture defined in the shaft, and a second oil relief passage extending from a second aperture defined in the shaft, the first and second oil relief passages being fluidly connected.

The shaft of the at least one driven bevel gear has a shaft axis, and the first oil relief passage may extends parallel to the shaft axis.

The first oil relief passage may be concentric with the shaft axis.

The second oil relief passage may orthogonal to the first oil relief passage.

The second oil relief passage may extend to a third aperture defined in the shaft.

The bevel gear wheel end assembly may further have a sleeve bearing, arranged between the at least one driven bevel gear and the shaft, wherein the sleeve bearing has a mid-plane, the mid-plane coinciding with at least one of the second or third apertures. Alternatively, the sleeve bearing may terminate adjacent at least one of the second or third apertures of the second oil relief passage.

The sleeve bearing may be a needle roller bearing.

The first oil relief passage may be a blind bore. The blind bore may have a conical end region.

The second oil relief passage may extend through the first oil relief passage at approximately two-thirds along the way between the first aperture and the conical end region. Alternatively, the second oil relief passage may extend through the first oil relief passage adjacent the conical end region.

The at least one driven bevel gear may be supported for rotation relative to the housing by a thrust bearing.

The thrust bearing may be a needle roller bearing.

The thrust bearing has a thickness. The second oil relief passage has a diameter. The thickness of the thrust bearing and the diameter of the second oil relief passage may overlap in a plane.

The shaft of the at least one driven bevel gear has a shaft axis which may be at an angle X to the drive axis, wherein X is not equal to 90 degrees. The angle X may be between 20 and 80 degrees. The angle may be between 40 and 60 degrees.

A plurality of driven bevel gears may be provided, each with a respective shaft, each shaft having a respective oil relief arrangement.

The respective shafts may extend from a spider.

According to a second aspect of the present invention there is provided a driven bevel gear for a wheel end assembly, the driven bevel gear having a shaft, the shaft having an oil relief arrangement provided therein.

The oil relief arrangement may have a first oil relief passage extending from a first aperture defined in the shaft, and a second oil relief passage extending from a second aperture defined in the shaft, the first and second oil relief passages being fluidly connected.

The shaft of the at least one driven bevel gear has a shaft axis, and the first oil relief passage may extend parallel to the shaft axis.

The first oil relief passage may be concentric with the shaft axis.

The second oil relief passage may be orthogonal to the first oil relief passage.

The second oil relief passage may extend to a third aperture defined in the shaft.

The first oil relief passage may be a blind bore.

The blind bore may have a conical end region.

The second oil relief passage may extend through the first oil relief passage at approximately two-thirds along the way between the first aperture and the conical end region.

Alternatively, the second oil relief passage may extend through the first oil relief passage adjacent the conical end region.

According to a third aspect of the present invention there is provided a vehicle comprising the bevel gear wheel end assembly as described above.

According to a fourth aspect of the present invention there is provided a vehicle comprising the driven bevel gear as described above.

BRIEF DESCRIPTION OF THE DRAWINGS

An embodiment of the invention will now be described, by way of example only, with reference to the accompanying figures, in which.

DETAILED DESCRIPTION

Figure 1:
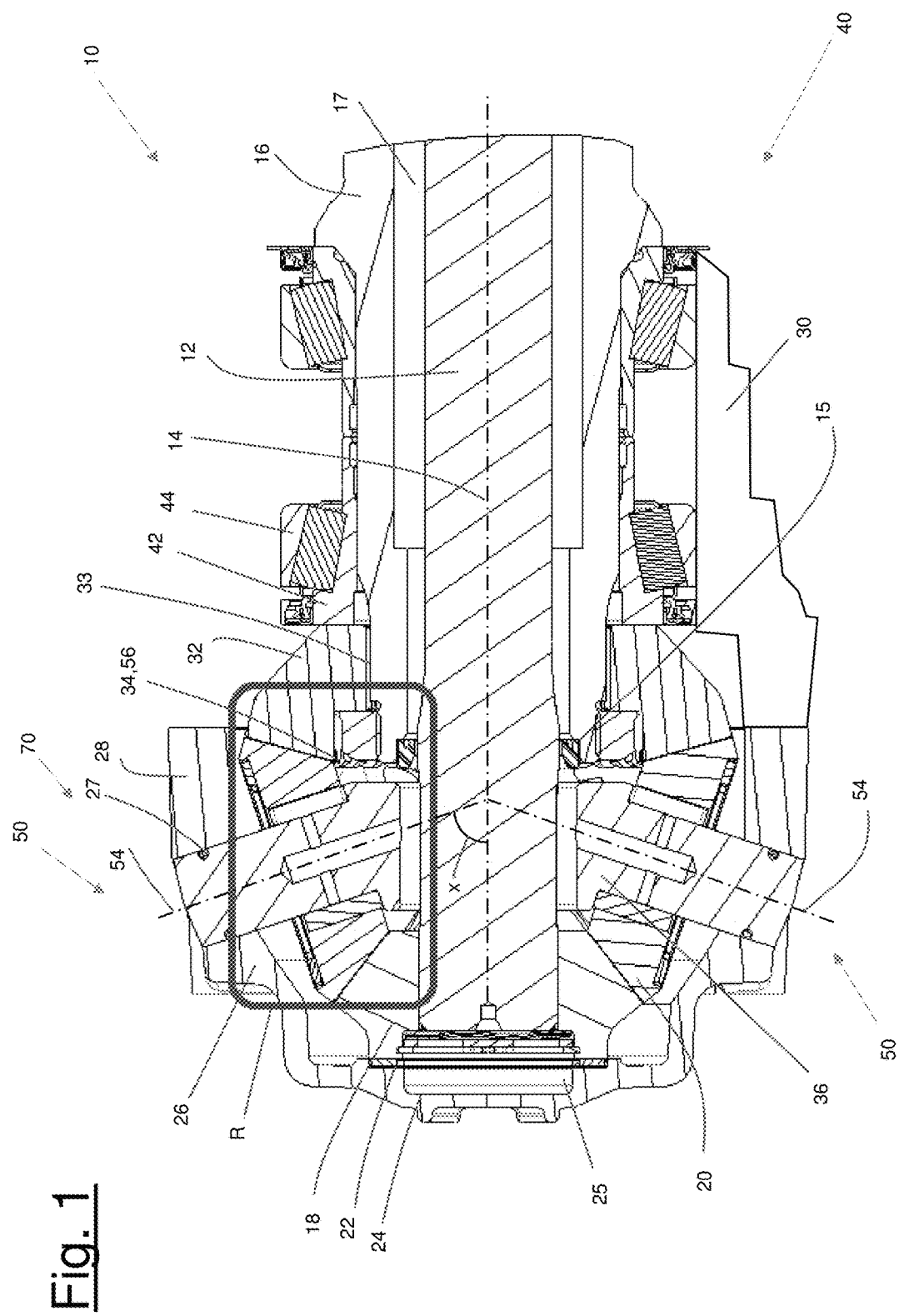
FIG. 1 is a schematic cross section of the wheel end assembly of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to the drawings, a bevel gear wheel end assembly 10 is shown in cross section. The bevel gear wheel end assembly 10 has a housing 24 which supports an input bevel gear 18, four driven bevel gears 50, (only two of which are visible in FIG. 1, the remaining two being removed for clarity) and a stationary bevel gear 32.

The input bevel gear 18 is coupled to an end region of a drive shaft 12 via a spline coupling 19. The input bevel gear 18 thus rotates about a drive shaft axis 14 of the drive shaft 12. The input bevel gear 18 has input bevel gear teeth 20 arranged on an external surface.

The drive shaft axis 14 extends from an inner side of the vehicle on the right hand side of FIG. 1 to an outer side of the vehicle, on the left hand side of FIG. 1.

The housing 24 is a three-part assembly, having a housing outer-portion 26, a housing mid-portion 28 and a housing inner-portion 30, arranged with respect to the inner and outer sides of the vehicle.

The drive shaft 12 is mounted for relative rotation with the housing outer portion 26 via end fitting 25. The input bevel gear 18 is supported for relative rotation with the housing outer portion 26 via bevel gear bearing 22, which in this case is a roller needle thrust bearing.

The stationary bevel gear 32 is coupled to an end region of a stub axle 16 via a spline coupling 33. The stationary bevel gear 32 thus does not rotate relative to the stub axle. The stub axle 16 is a hollow tube and defines a cavity 17 for the drive shaft 12. A seal 15 is provided at the end of the stub axle 16, on the outer side of the vehicle. The stub axle 16 has a stub axle axis which is coincident with the drive shaft axis 14. The stationary bevel gear 32 has stationary bevel gear teeth 34 arranged on an external surface.

A wheel bearing assembly 40 is provided surrounding a portion of the stub axle 16. The wheel bearing assembly 40 has an inner race 42 which is fixed in rotation with the stub axle 16, and an outer race 44 which rotates relative to the inner race 42. A wheel is mounted on the outer race 44 and is driven by the housing 24.

The four driven bevel gears 50 are each mounted on respective shafts 52 fixed relative to the housing 24, specifically the housing outer-portion 26 and the housing mid-portion 28. An O-ring seal seals the shaft 52, housing outer-portion 26 and the housing mid-portion 28. The four shafts 52 extend from a spider 36, which has a central hole through which the drive shaft 12 passes.

Figure 3:
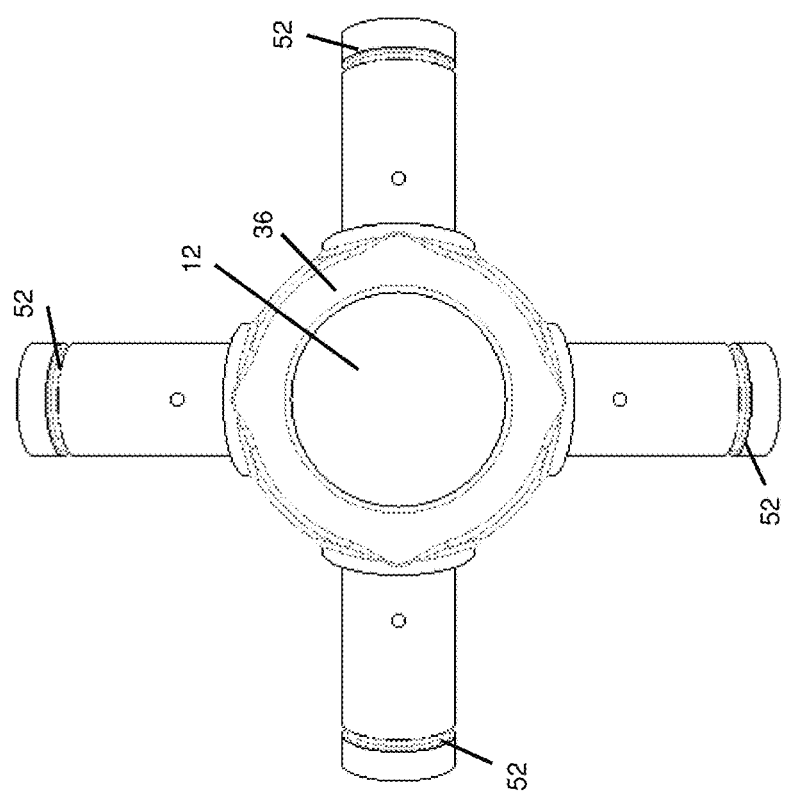
FIG. 3 is an end-on view of the drive shaft.

The four shafts 52 extend from the spider 36 at circumferential spacing, i.e., at 90 degrees spacing when viewing the drive shaft 12 end-on, (see FIG. 3).

The four driven bevel gears 50 and their respective shaft 52 are substantially identical, such that only one shall be described in detail.

The driven bevel gear shaft 52 has a driven bevel gear shaft axis 54. The shaft axis 54 extends from the drive axis at an angle X of 60 degrees. An oil relief arrangement 70 is provided in the shaft 52 of the driven bevel gear 50, as explained in more detail below.

The driven bevel gear 50 has driven bevel gear teeth 56. The driven bevel gear teeth 56 mesh with the input bevel gear teeth 20 on the outer side of the vehicle. The driven bevel gear teeth 56 mesh with the stationary bevel gear teeth 34 on the inner side of the vehicle.

Thus rotation of the input bevel gear 18 about the drive axis 14 at a first speed causes rotation of the housing 24 about the drive axis 14 at a second speed, different from the first speed.

Figure 2:
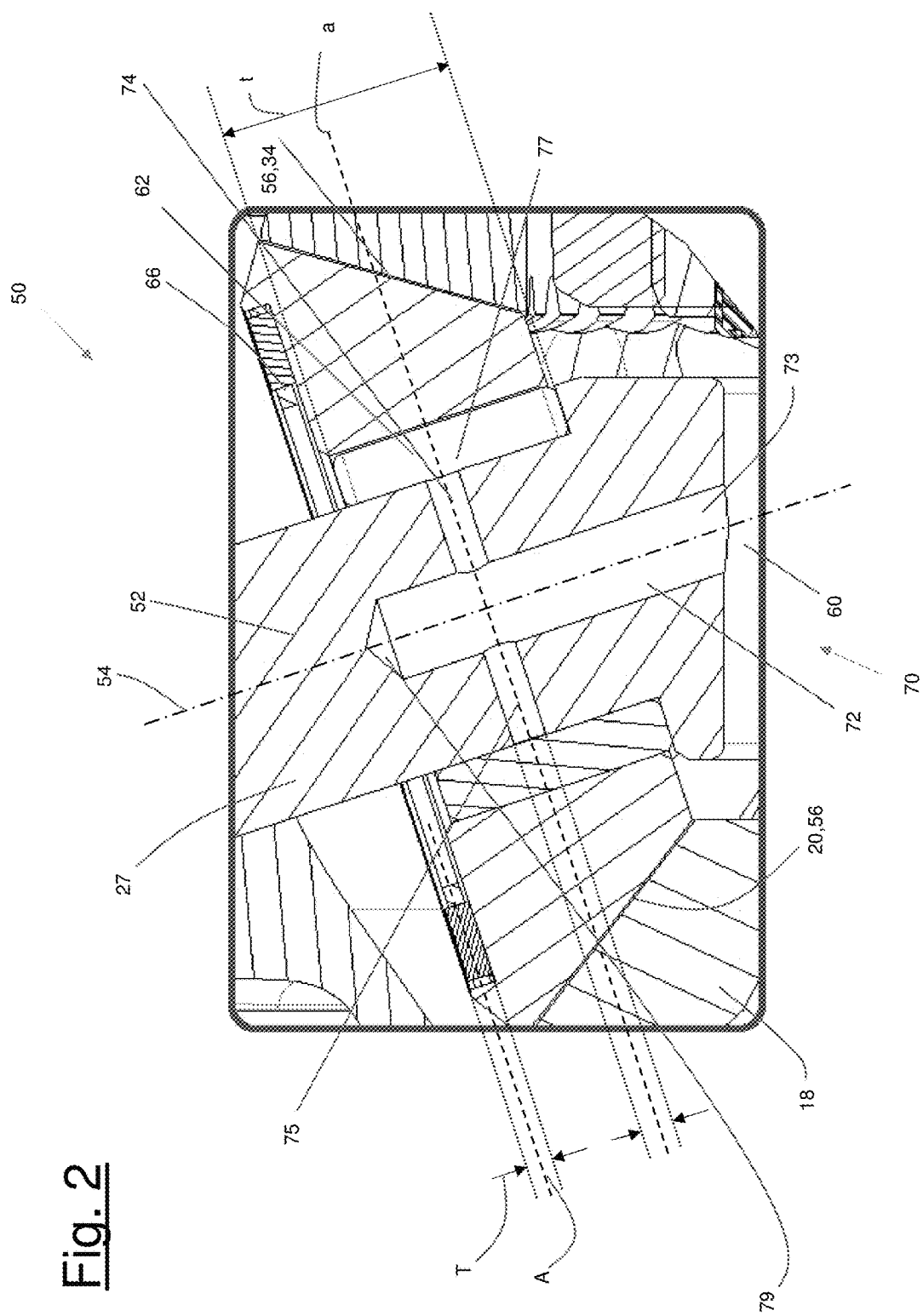
FIG. 2 is an enlarged view of the region R highlighted in FIG. 1.

Referring principally to FIG. 2, the oil relief arrangement 70 has a first oil relief passage 72 extending from a first aperture 73 defined in the shaft 52. The first oil relief passage 72 extends from the first aperture 73 as a blind bore, terminating in a conical end region 79.

The first oil relief passage 72 is concentric with the shaft axis 54, extending parallel thereto.

The oil relief arrangement 70 also has and a second oil relief passage 74 extending between a second aperture 75 and a third aperture 77 defined in the shaft 52.

The second oil relief passage 74 is orthogonal to the first oil relief passage 72, and intersects the first oil relief passage 72 at approximately two-thirds along the way between the first aperture 73 and the conical end region 79 of the first oil relief passage 72. The first and second oil relief passages 72, 74 are thus fluidly connected.

The first aperture 73 of the first oil relief passage 72 is exposed to a cavity defined by the housing 24 and the seal 15 provided at the end of the stub axle 16.

A sleeve bearing 62 is arranged between the driven bevel gear 50 and the shaft 52. The sleeve bearing 62 is a needle roller bearing. The sleeve bearing 62 allows relative rotation of the shaft 52 and the driven bevel gear 50.

The sleeve bearing 62 is annular and encircles a portion of the shaft 52. The sleeve bearing 62 terminates adjacent the second and third apertures 75, 77 provided in the shaft 52.

The sleeve bearing 62 has a thickness "t" measured in parallel with the shaft axis 54. The sleeve bearing 62 has a mid-plane "a", also measured in parallel with the shaft axis 54. The sleeve bearing 62 is arranged relative to the second oil relief passage 74 such that the mid plane "a" coincides with the second and third apertures 75, 77.

A thrust bearing 66 is arranged between the driven bevel gear 50 and the housing 24, specifically the housing outer-portion 26 and the housing mid-portion 28. The thrust bearing 66 is a needle roller bearing. The thrust bearing 66 allows rotation of the housing outer-portion 26 and the housing mid-portion 28 relative to the driven bevel gear 50.

The thrust bearing 66 is annular and orientated such that a longitudinal axis of the thrust bearing 66 is coincident with the shaft axis 54 of the shaft 52.

In use, a lubricant, such as oil, is provided in the cavity 60. The lubricant migrates from the cavity 60 along the first oil relief passage 72, as the four driven bevel gears 50 rotate about the drive shaft axis 14. The lubricant is subsequently forced along the second oil relief passage 72 from the intersection of the first oil relief passage 72, towards the second and third apertures 75, 77 of the second oil relief passage 74.

As the lubricant exits the second and third apertures 75, 77 of the second oil relief passage 74, it lubricates the adjacent sleeve bearing 62 and thrust bearing 66, to ensure efficient working thereof.

The lubricant is returned to the cavity 60 via a gap between the sleeve bearing 62 and the shaft 52 or a gap between the sleeve bearing 62 and the driven bevel gear 50, or between the meshing teeth 20, 56 of the input bevel gear 18 and the driven bevel gear 50.

It is understood that the driven bevel gear as described above may be employed in alternate wheel end assembly arrangements. Furthermore, both the driven bevel gear described above, and the bevel gear wheel end assembly described above, may be employed in a variety of vehicles.

In the specific embodiment described above, the shaft axis 54 extends from the drive axis at an angle X of 60 degrees. It is to be understood that the angle X may be varied between 20 and 80 degrees without departing from the scope of the invention.

In the specific embodiment described above, four shafts 52 extend from the spider 36. It is to be understood that any number of shafts 52 may be used, such a three or five, provided at suitable circumferential spacing.

In an alternate arrangement, not shown in the drawings, the second oil relief passage 74 is orthogonal to the first oil relief passage 72, and intersects the first oil relief passage 72 adjacent the conical end region 79 of the first oil relief passage 72, the thrust bearing 66 has a thickness "T", measured in parallel with the shaft axis 54. The thrust bearing has a mid-plane "A", also measured in parallel with the shaft axis 54. The second oil relief passage 74 has a diameter "D". The thrust bearing 66 is arranged relative to the second oil relief passage 74 such that the thickness "T" of the thrust bearing 66 and the diameter D of the second oil relief passage 74 overlap in the plane "A".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bevel gear wheel end assembly comprising:
    a housing;
    an input bevel gear rotatably driven by a drive shaft;
    a stub axle defining a cavity that directly receives the drive shaft;
    at least one driven bevel gear, wherein the input bevel gear meshes with the at least one driven bevel gear and the at least one driven bevel gear is mounted on a shaft that is fixed relative to the housing, wherein an oil relief arrangement is provided in the shaft; and
    a stationary bevel gear non-rotatably connected to the stub axle, wherein the at least one driven bevel gear meshes with the stationary bevel gear such that rotation of the input bevel gear about a drive axis at a first speed causes rotation of the housing about the drive axis at a second speed, different from the first speed.

2. The bevel gear wheel end assembly of claim 1 wherein the oil relief arrangement comprises a first oil relief passage extending from a first aperture defined in the shaft, and a second oil relief passage extending from a second aperture defined in the shaft, the first and second oil relief passages being fluidly connected.

3. The bevel gear wheel end assembly of claim 2 wherein the shaft of the at least one driven bevel gear has a shaft axis, and the first oil relief passage extends parallel to the shaft axis, and wherein the second oil relief passage is orthogonal to the first oil relief passage.

4. The bevel gear wheel end assembly of claim 2 wherein the second oil relief passage extends to a third aperture defined in the shaft.

5. The bevel gear wheel end assembly of claim 4 further comprising a sleeve bearing arranged between the at least one driven bevel gear and the shaft, wherein the sleeve bearing has a mid-plane which coincides with at least one of the second or third apertures of the second oil relief passage.

6. The bevel gear wheel end assembly of claim 4 further comprising a sleeve bearing arranged between the at least one driven bevel gear and the shaft, wherein the sleeve bearing terminates adjacent at least one of the second or third apertures of the second oil relief passage.

7. The bevel gear wheel end assembly of claim 6 wherein the sleeve bearing is a needle roller bearing.

8. The bevel gear wheel end assembly of claim 2 wherein the first oil relief passage is a blind bore.

9. The bevel gear wheel end assembly of claim 8 wherein the blind bore has a conical end region.

10. The bevel gear wheel end assembly of claim 9 wherein the second oil relief passage extends through the first oil relief passage at approximately two-thirds along the way between the first aperture and the conical end region.

11. The bevel gear wheel end assembly of claim 9 wherein the second oil relief passage extends through the first oil relief passage adjacent the conical end region.

12. The bevel gear wheel end assembly of claim 9 wherein the at least one driven bevel gear is supported for rotation relative to the housing by a thrust bearing.

13. The bevel gear wheel end assembly of claim 12 wherein the thrust bearing is a needle roller bearing.

14. The bevel gear wheel end assembly of claim 1 wherein the shaft of the at least one driven bevel gear has a shaft axis that is at an angle to the drive axis, wherein the angle is not equal to 90 degrees.

15. The bevel gear wheel end assembly of claim 1 wherein a plurality of driven bevel gears is provided, each driven bevel gear with a respective shaft, and each shaft having a respective oil relief arrangement.

16. The bevel gear wheel end assembly of claim 15 wherein the respective shafts extend from a spider.

17. A vehicle comprising:
    a bevel gear wheel end assembly that includes:
        a housing;
        an input bevel gear rotatably driven by a drive shaft;
        a stub axle defining a cavity that directly receives the drive shaft;
        at least one driven bevel gear, wherein the input bevel gear meshes with the at least one driven bevel gear and the at least one driven bevel gear is mounted on a shaft that is fixed relative to the housing, wherein an oil relief arrangement is provided in the shaft; and
        a stationary bevel gear non-rotatably connected to the stub axle, wherein the at least one driven bevel gear meshes with the stationary bevel gear such that rotation of the input bevel gear about a drive axis at a first speed causes rotation of the housing about the drive axis at a second speed, different from the first speed.

* * * * *